(12) United States Patent
Eppers, Jr.

(10) Patent No.: US 6,450,118 B1
(45) Date of Patent: Sep. 17, 2002

(54) CLUSTER PRE-LIFT FOR MILKING PARLOR

(75) Inventor: Paul A. Eppers, Jr., Madison, WI (US)

(73) Assignee: DEC International, Inc., Madison, WI (US)

( * ) Notice: Subject to any disclaimer, the term of this patent is extended or adjusted under 35 U.S.C. 154(b) by 33 days.

(21) Appl. No.: 09/607,231

(22) Filed: Jun. 30, 2000

(51) Int. Cl.⁷ .................................................. A01J 5/04
(52) U.S. Cl. ................................................... 119/14.53
(58) Field of Search .......................... 119/14.01, 14.02, 119/14.03, 14.08, 14.1, 14.13, 14.14

(56) References Cited

U.S. PATENT DOCUMENTS

| | | | |
|---|---|---|---|
| 3,870,021 A | | 3/1975 | Nederbragt ............... 119/14.13 |
| 4,805,557 A | * | 2/1989 | van der Lely et al. .... 119/14.08 |
| 4,867,103 A | * | 9/1989 | Montalescot et al. .... 119/14.08 |
| 5,361,722 A | * | 11/1994 | Tecza ...................... 119/14.03 |
| 5,379,721 A | * | 1/1995 | Dessing et al. .......... 119/14.08 |
| 6,205,949 B1 | * | 3/2001 | van den Berg ........... 119/14.02 |
| 6,269,766 B1 | * | 8/2001 | Birk .......................... 119/14.1 |

FOREIGN PATENT DOCUMENTS

NZ      NZ 247998      1/1996

* cited by examiner

Primary Examiner—Thomas Price
(74) Attorney, Agent, or Firm—Andrus, Sceales, Starke & Sawall, LLP

(57) ABSTRACT

A milking parlor has a platform receiving cows and having a plurality of spaced stall dividers defining milking stalls therebetween, each stall divider having a milking cluster including a claw and teat cups. A cluster drop and lift retractor, provided by a detacher cylinder, raises the cluster to an up position above the platform ready for attachment of the teat cups to the teats of a cow in a respective stall, and lowers the cluster to a down position below the platform after detachment of the teat cups from the teats of the cow. A cluster prelift control and sequence actuates the retractor to raise the cluster to the up position prior to milking such that when the dairyman operator is ready to milk the cow, the milking cluster is already in the up position and ready for attachment of the teat cups to the teats of the cow, without the dairyman operator having to bend down to lift the milking cluster from the down position.

22 Claims, 2 Drawing Sheets

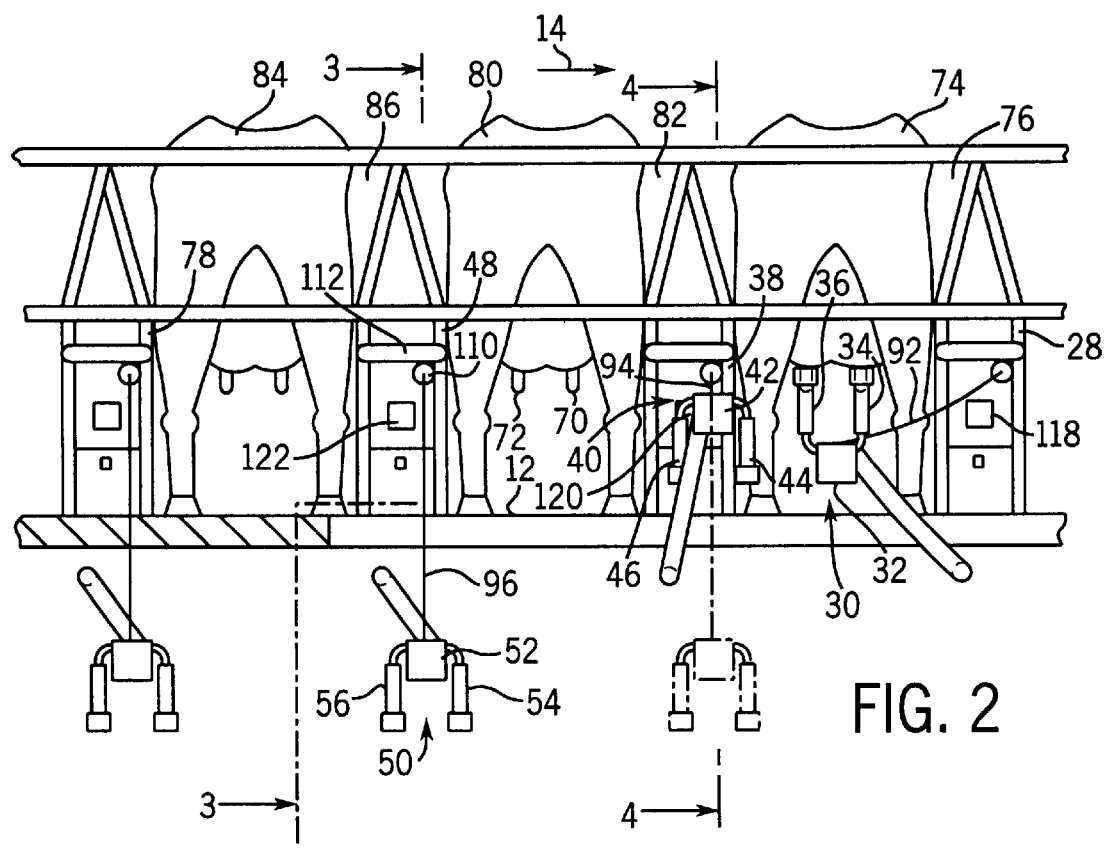
FIG. 2
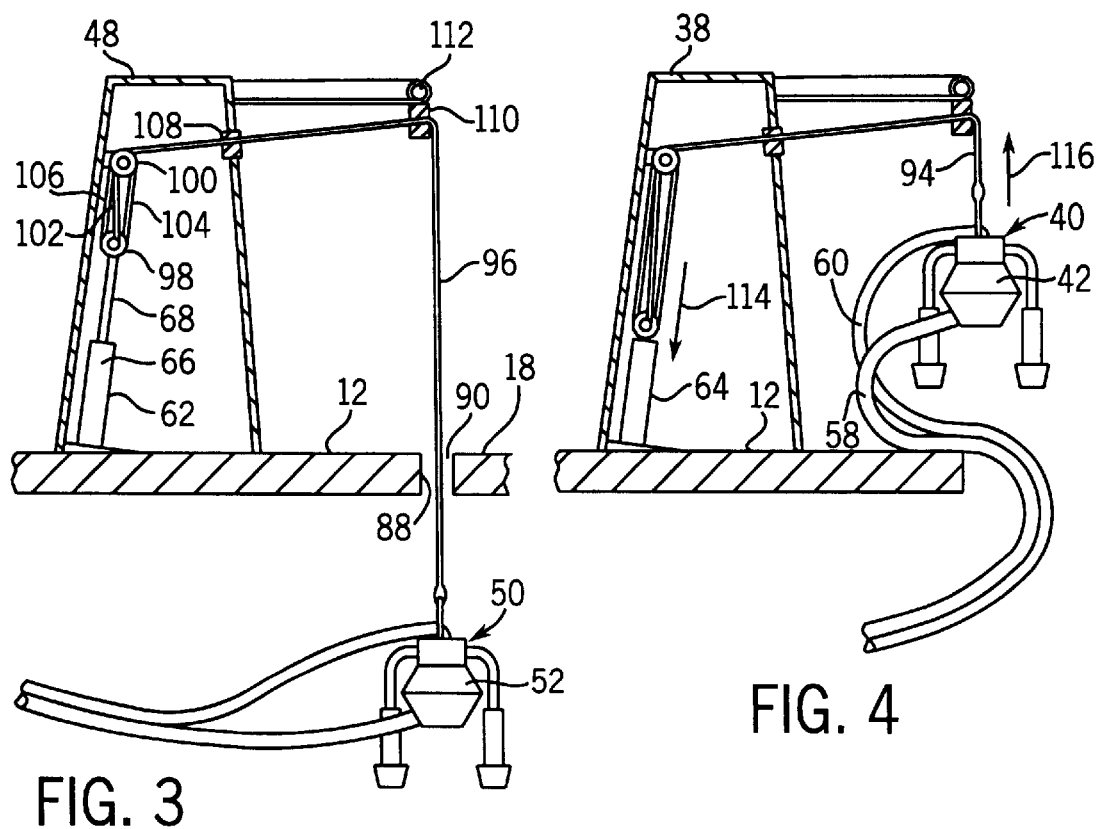
FIG. 3
FIG. 4

CLUSTER PRE-LIFT FOR MILKING PARLOR

BACKGROUND AND SUMMARY OF THE INVENTION

The invention relates to milking parlors, and more particularly to the milking cluster, and further particularly to a labor saving system for the dairyman operator for attachment of the teat cups.

The invention arose during continuing development efforts relating to rotary milking parlors, though the invention has broader application to parallel, herringbone and other types of parlors, particularly where the milking units are attached in sequence.

A cluster drop feature is known in the prior art in various types of parlors. After detachment of the teat cups from the teats of the cow, the milking cluster is lowered to a position below the cow platform for a backflushing operation, and to keep the cluster clean and protected from the cow's feet as the cow exits the parlor, and the next cow enters the parlor, and also to facilitate easier access to the cow's udder during prepping.

In a rotary milking parlor, the cow enters across a stationary bridge onto a rotating platform. The platform rotates towards the operator area where cow prepping and attaching of the cluster is done. When the cow returns to the exit, she backs off the platform onto the stationary bridge exit. Prior to such exit, and after detachment of the teat cups, the cluster is lowered by a cord to a down position such that the cluster passes beneath the bridge, with the cord passing through a gap between the platform and the bridge. The speed of rotation of the platform is chosen to allow sufficient milking time and sufficient detachment time prior to the cow returning to the bridge. Upon completion of a cow's milking, typically by sensed milk flow, the vacuum to the teat cups is cut-off such that the teat cups detach from the teats of the cow, while at the same time the cluster cord is retracted to raise the cluster to an up position, to prevent the cluster from falling on the cow platform. After a given delay, typically about 10 seconds, the cord is released, to lower the cluster to a down position below the platform. The speed of rotation of the platform is also controlled such that the noted detachment and delay are completed prior to the respective stall rotating back to the bridge, such that the cluster is below the platform and passes under the bridge, with the cord passing through the noted gap. After the cluster passes beneath the bridge, it enters the operator attachment milking station area. The dairyman operator bends down and lifts the milking cluster and attaches the teat cups to the teats of the cow in the respective stall, and the cycle continues.

In the present invention, the cluster is raised to an up position above the platform after passing below the bridge and prior to milking. This reduces the milking attachment time, eliminates the bending down motion of the dairyman operator while trying to grasp the cluster, and allows easier access to the cluster. When the stall on the platform has rotated to the dairyman operator at a milking station, or when the dairyman operator is otherwise ready to milk a cow at a respective stall as in a parallel or herringbone parlor, the cluster is released from its up position for grasping by the dairyman operator and attachment to the teats. Various pre-lift sequences may be used. In one sequence, actuation of the attachment command actuator by the dairyman operator at a milking station actuates the retractor, provided by the detacher cylinder, at the present stall to release the cord and cluster from the up position to permit attachment of the teat cups to the teats of the cow in the present stall, and simultaneously actuates the retractor at a succeeding stall to retract the cord and raise the cord and cluster at the succeeding stall to the up position such that when the platform rotates the succeeding stall to the milking station, the cluster at the now-rotated succeeding stall is already in the up position and ready for attachment without the dairyman operator having to bend down and lift the cluster from the down position. The dairyman operator at the milking station actuates the attachment command actuator at the now-rotated succeeding stall to actuate the retractor at the now-rotated succeeding stall to release the cord and cluster from the up position to permit attachment of the teat cups to the teats of the cow in the now-rotated succeeding stall, and simultaneously actuating the retractor at a further succeeding stall to retract the cord to raise the cord and cluster at the further succeeding stall to the up position. Upon completion of milking, the cluster drop sequence is carried out as in the prior art, as noted above.

BRIEF DESCRIPTION OF THE DRAWINGS

FIG. 2 is a sectional view taken along line 2—2 of FIG. 1 and showing sequencing in accordance with the invention.

FIG. 3 is a sectional view taken along line 3—3 of FIG. 2.

FIG. 4 is a sectional view taken along line 4—4 of FIG. 2.

DETAILED DESCRIPTION OF THE INVENTION

Figure 1:
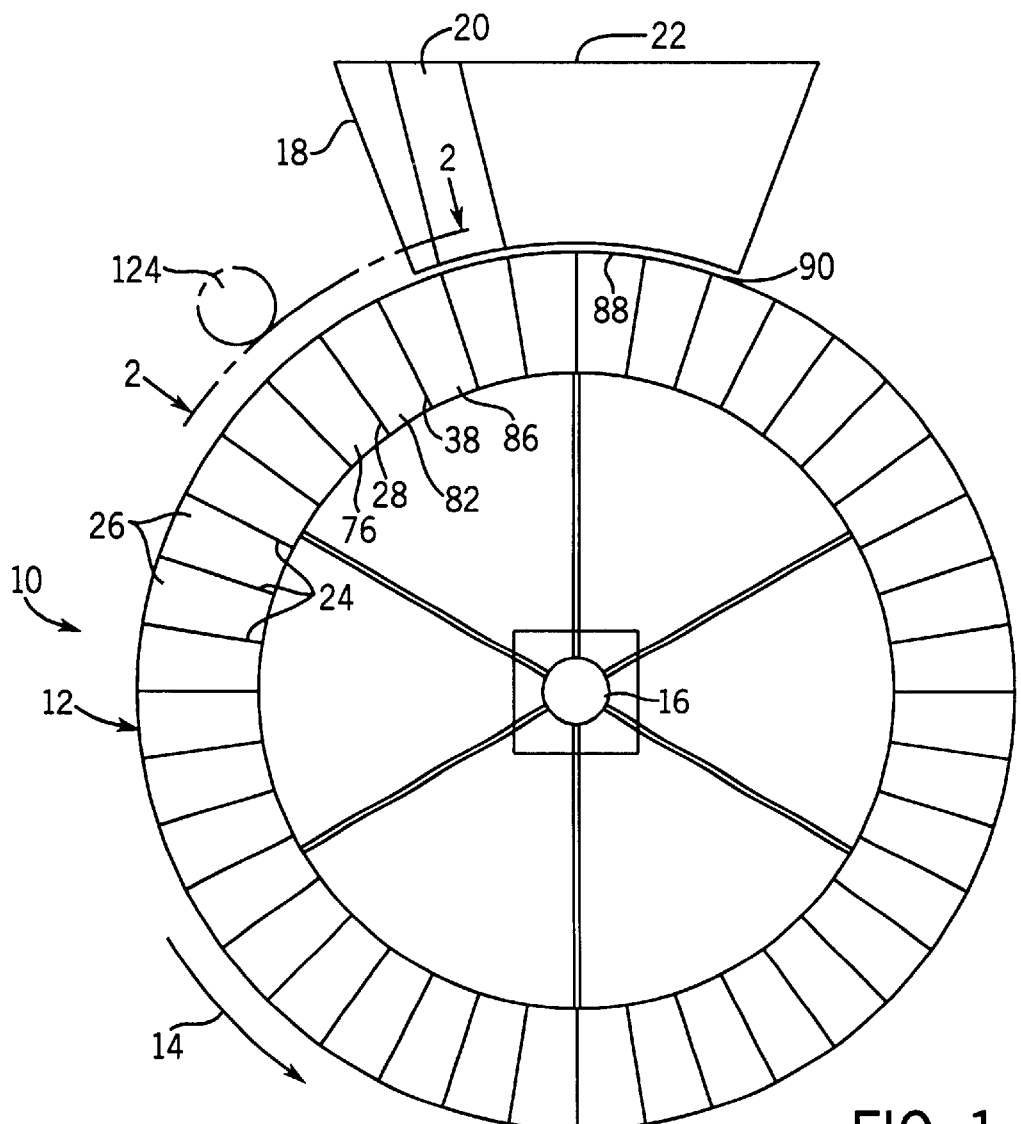
FIG. 1 is a top plan schematic view of a rotary milking parlor.

FIG. 1 shows a rotary milking parlor 10 including a rotary platform 12 rotating counterclockwise as shown at arrow 14 about central hub 16. The platform receives cows across a stationary bridge 18 having an entrance lane 20 and an exit area 22. The platform has a plurality of circumferentially spaced stall dividers 24 defining milking stalls 26 therebetween. Each stall divider has a milking cluster including a claw and teat cups, for example stall divider 28, FIG. 2, having milking cluster 30 including claw 32 and four teat cups, two of which are shown at 34 and 36, and for example stall divider 38 having milking cluster 40 including claw 42 and four teat cups, two of which are shown at 44 and 46, and for example stall divider 48 having milking cluster 50 including claw 52 and four teat cups, two of which are shown at 54 and 56, etc. Each cluster has a milk hose and a pulsation hose connected to the claw, as known in the prior art, and for example as shown at milk hose 58, FIG. 4, and pulsation hose 60.

Each stall divider has a cluster drop and lift retractor, for example, as shown at retractor 62 in FIG. 3 for stall divider 48, and at retractor 64 in FIG. 4 for stall divider 38. Each retractor is provided by the pneumatic detacher cylinder which is already present in the respective stall divider and which is known in the prior art, for example air cylinder 66 having an extensible and retractable plunger 68. The extended position is shown in FIG. 3, and the retracted position is shown in FIG. 4. The cluster drop and lift retractor raises the cluster to an up position as shown at cluster 40 in FIGS. 4 and 2, above platform 12 ready for attachment of the teat cups to the teats, two of which are shown at 70 and 72 in FIG. 2, of a cow in a respective stall, and lowering the cluster to a down position as shown at cluster 50 in FIGS. 3 and 2, below platform 12 after detachment of the teat cups from the teats of the cow.

FIG. 2 shows cow 74 in stall 76 between stall dividers 28 and 38, and shows cow 80 in stall 82 between stall dividers 38 and 48, and shows cow 84 in stall 86 between stall dividers 48 and 78, and so on. Platform 12 has a circumferential border 88, FIGS. 1, 3, spaced from bridge 18 by a gap 90 permitting rotation of platform border 88 past bridge 18. Each cluster is attached to a respective retractor by a respective cord, for example 92, 94, 96, etc. The cord has a retracted position in the up position of the cluster, FIG. 4, and an extended position in the down position of the cluster, FIG. 3. The cord passes through gap 90 in the noted extended position, and the respective milking cluster, e.g. milking cluster 50 in FIG. 3, passes beneath bridge 18. Plunger 68 of detacher cylinder 66 is connected to cord 96 by a three-to-one pulley ratio reduction provided by a pulley 98 on the end of plunger 68 and a pulley 100 mounted to stall divider 48. Three passes of cord 96 extend around the pulleys as shown at 102, 104, 106 after which the cord passes through guide sleeve 108 in stall divider 48 and then through guide sleeve 110 mounted to rail 112 extending radially outwardly from stall divider 48 such that guide sleeve 110 is at a radially outward position at or beyond platform border 88. The retractor raises the cluster to the up position after passing bridge 18 and prior to attachment of the teat cups to the teats, to save a dairyman operator from bending down to lift the cluster from the down position. Upon retraction of the plunger of the air cylinder as shown at arrow 114 in FIG. 4, cord 94 is retracted and cluster 40 is raised upwardly as shown at arrow 116 to the raised position as shown at cluster 40 in FIG. 2.

Each stall divider includes an attachment command actuator 118, 120, 122, etc., actuatable by the dairyman operator at a milking station 124 to: a) actuate the retractor at the present stall, e.g. 76, to release cord 92 and cluster 30 from the up position to permit attachment of the teat cups to cow 74 in stall 76, and b) simultaneously actuate retractor 64 at succeeding stall 82 to retract cord 94 and raise cord 94 and cluster 40 at succeeding stall 82 to the up position, such that when platform 12 rotates succeeding stall 82 to milking station 124, cluster 40 at stall 82 is already in the up position and ready for attachment without the dairyman operator having to bend down and lift the cluster from the down position. After such rotation, the dairyman operator at milking station 124 actuates attachment command actuator 120 at now-rotated succeeding stall 82 to: a) actuate retractor 64 at now-rotated succeeding stall 82 to release cord 94 and cluster 40 from the up position to permit attachment of the teat cups to the teats of cow 80 in the now-rotated succeeding stall 82; and b) actuate retractor 66 at further succeeding stall 86 to retract cord 96 to raise cord 96 and cluster 50 at further succeeding stall 86 to the up position.

Figure 5:
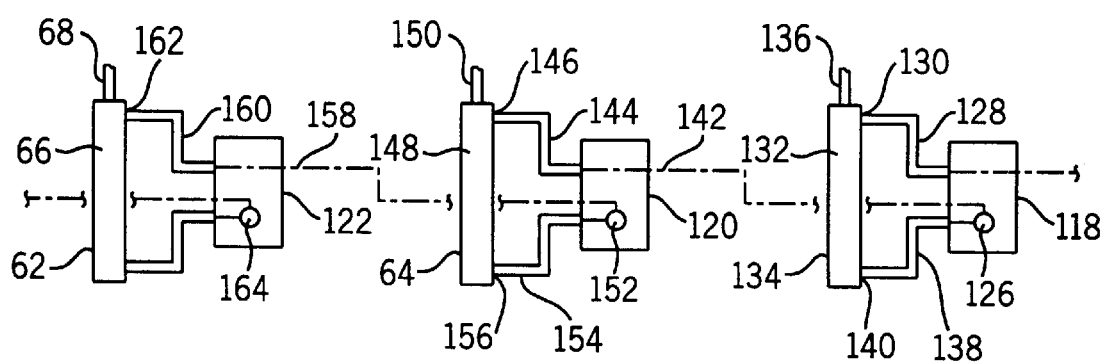
FIG. 5 is a schematic view of a portion of the structure of FIG. 2 and illustrating operation in accordance with the invention.

Referring to FIG. 5, actuation by the dairyman operator of palm button or switch 126 of attachment command actuator 118 cuts off air pressure at line 128 to retraction input 130 of detacher air cylinder 132 of retractor 134 such that plunger 136 may extend, allowing cluster 30 to begin to fall due to gravity. Upon actuation of palm button 126, air pressure may be applied if desired by line 138 to extension input 140 of air cylinder 132, to assist extension of plunger 136. Cord 92 is attached to the end of plunger 136. The dairyman operator grasps cluster 30 as it begins to drop as cord 92 extends, and attaches the teat cups to the teats of cow 74. Upon actuation of palm button 126 by the dairyman operator at milking station 124 at stall 76, an electrical signal is simultaneously sent via electrical line 142 to attachment command actuator 120 such that the latter supplies air pressure on line 144 to retraction input 146 of air cylinder 148 of retractor 64 such that plunger 150 retracts, i.e. moves downwardly in FIG. 5, which is also downwardly as shown at arrow 114 in FIG. 4, to raise cord 94 and cluster upwardly as shown at arrow 116 to the up position as shown in solid line at cluster 40 in FIG. 2. Thus, when stall 76 is at milking station 124, and palm button 126 of attachment command actuator 118 is actuated by the dairyman operator, retractor 134 is actuated at stall 76, allowing extension of plunger 136 and release of cord 92 and cluster 30 from the up position to permit attachment of the teat cups of cluster 30 to the teats of cow 74, and simultaneously actuating via line 142 the retractor 64 at succeeding stall 82 to retract plunger 150 and cord 94 to raise cord 94 and cluster 40 at succeeding stall 82 to the up position as shown in solid line at cluster 40 in FIG. 2 such that when platform 12 rotates succeeding stall 82 to milking station 124, cluster 40 at stall 82 is already in the up position and ready for attachment without the dairyman operator having to bend down and lift the cluster from the down position.

When stall 82 has rotated to milking station 124, the dairyman operator actuates palm button 152 of attachment command actuator 120 which cuts off the air pressure in line 144 to retraction input 146 of detacher air cylinder 148, to allow extension of plunger 150 and in turn extension of cord 94 and downward movement of cluster 40 due to gravity, whereupon the dairyman operator grasps cluster 40 and attaches the teat cups thereof to the teats of cow 80 in stall 82. Upon actuation of palm button 152, air pressure may be supplied on line 154 to extension input 156 of air cylinder 148, to assist the noted extension of plunger 150 if desired. Actuation of palm button 152 also sends an electrical signal on electrical line 158 to attachment command actuator 122 on stall divider 48 which in turn supplies a positive air pressure signal on line 160 to retraction input 162 of detacher air cylinder 66 of retractor 62 such that plunger 68 is retracted and moves downwardly in FIG. 5 which in turn retracts cord 96 and pulls cord 96 and cluster 50 upwardly to the up position, which is desired because stall 86 has now rotated beyond bridge 18. Hence, when the dairyman operator at milking station 124 actuates palm button 152 of attachment command actuator 120 at the now-rotated succeeding stall 82, which has rotated to milking station 124, retractor 64 at now-rotated succeeding stall 82 is actuated to release cord 94 and cluster 40 from the up position to permit attachment of the teat cups of cluster 40 to cow 80 in now-rotated stall 82, and simultaneously the retractor 62 at further succeeding stall 86 has been actuated via line 158 to retract cord 96 and raise cord 96 and cluster 50 at further succeeding stall 86 to the up position. Upon further rotation of platform 12 bringing stall 86 to milking station 124, the dairyman operator actuates palm button 164 of attachment command actuator 122, and the noted cycle continues. Detachment of the milking cluster from the cow is in accordance with the prior art, as described above. Upon completion of milking, typically as sensed by milk flow, vacuum to the teat cups is cut off, and the teat cups detach from the teats of the cow. Simultaneously with such detachment, the detacher air cylinder of the respective retractor retracts its respective plunger to in turn retract the respective cluster cord and raise the cluster upwardly to the up position. The cluster is held in the up position for a given delay, typically about seconds, after which the cluster is lowered to the down position. As noted above, the speed of rotation of platform 12 is chosen to allow sufficient time for completion of milking and for the noted delay, so that the cluster is in the down position prior to reaching exit area 22 of bridge 18, such that the cluster passes beneath the bridge and the cord passes through gap 90 as the platform rotates, all as known in the prior art.

In the disclosed embodiment, the noted succeeding stall such as 82 is immediately adjacent the present stall such as 76, with no stall therebetween. In other embodiments, for example where two or more dairyman operators are working at the same time, the succeeding stall may be separated from the present stall by one or more stalls therebetween, particularly if the operators are working side-by-side at adjacent stalls, so that for example the actuation signal on line 142, FIG. 5, from attachment command actuator 118 would be provided to attachment command actuator 122 rather than 120.

In addition to the cluster drop function provided by retractors 134, 64, 62, etc., such retractors in combination with the present system and attachment command actuator combination and sequence, provide a cluster pre-lift retractor and control raising the cluster to an up position above the platform before the respective stall has rotated to a dairyman operator at a milking station, such that when the stall has rotated to the milking station, the milking cluster is already in the up position and ready for attachment of the teat cups to the teats of a cow, without the dairyman operator having to bend down to lift the milking cluster to the up position. The system provides a method for saving a dairyman operator from bending down to lift the milking cluster, by pre-lifting the cluster to an up position above the platform before the respective stall has rotated to a dairyman operator at a milking station. The system is applicable to various types of parlors, including rotary, parallel, herringbone, and the like. The cluster drop and lift retractor raises the cluster to an up position above the platform ready for attachment of the teat cups to the teats of a cow in a respective stall, and lowers the cluster to a down position below the platform after detachment of the teat cups from the teats of the cow. Each stall divider includes an attachment command actuator actuatable by the dairyman operator at a milking station to: a) actuate the retractor at the present stall to release the cluster from the up position to permit attachment of the teat cups to the teats of the cow in the present stall; and b) actuate the retractor at a subsequent stall to raise the cluster at the subsequent stall to the up position such that when the dairyman operator is ready to milk the cow in the subsequent stall, the cluster at the subsequent stall is already in the up position and ready for the attachment of the teat cups to the teats of the cow without the dairyman operator having to bend down and lift the cluster from the down position. The dairyman operator when at the subsequent stall actuates the attachment command actuator at such subsequent stall to: a) actuate the retractor at the subsequent stall to release the cluster from the up position to permit attachment of the teat cups to the teats of the cow in the subsequent stall; and b) actuate the retractor at a further subsequent stall to raise the cluster at the further subsequent stall to the up position such that when the dairyman operator is ready to milk the cow in the further subsequent stall, the cluster at the further subsequent stall is already in the up position and ready for attachment of the teat cups to the teats of the cow without the dairyman operator having to bend down and lift the cluster from the down position.

Various other types of pre-lift systems and sequences are possible. For example, if it is desired to not send a prelift signal to an empty stall, a proximity sensor may be provided in the stall such that if such stall is empty, the pre-lift signal from a preceeding stall is bypassed past the empty stall and instead sent on to the next occupied stall. In another alternative, a pre-lift signal may be sent simultaneously to more than one stall, or to all stalls, the latter not being suitable for a rotary parlor but rather for parallel and herringbone parlors. In another alternative, the pre-lift signal could be sent by a stationary point in a rotary parlor, rather than a preceeding stall, such that when a stall passes a given point during its rotation in the parlor, such given point triggers a pre-lift command actuation in such stall passing therepast, such that the cluster is raised to its up position and ready for attachment by a downstream dairyman operator.

It is recognized that various equivalents, alternatives and modifications are possible within the scope of the appended claims.

What is claimed is:

1. A milking parlor comprising a platform receiving cows, said platform having a plurality of spaced stall dividers defining milking stalls therebetween, the stall divider having a milking cluster comprising a claw and teat cups, and a cluster drop and lift retractor raising said cluster to an up position above said platform ready for attachment of said teat cups to the teats of a cow in a respective stall, and lowering said cluster to a down position below said platform after detachment of said teat cups from the teats of the cow.

2. The invention according to claim 1 wherein said stall divider includes an attachment command actuator actuatable by the dairyman operator at a milking station to:
   a) actuate the retractor at the present stall to release said cluster from the up position to permit attachment of said teat cups to the teats of the cow in the present stall and;
   b) actuate the retractor at a subsequent stall to raise the cluster at said subsequent stall to the up position such that when the dairyman operator is ready to milk the cow in said subsequent stall, the cluster at said subsequent stall is already in the up position and ready for attachment of said teat cups to the teats of the cow without the dairyman operator having to bend down and lift the cluster from the down position, and wherein the dairyman operator when at said subsequent stall actuates the attachment command actuator at said subsequent stall to:
   a) actuate the retractor at said subsequent stall to release said cluster from the up position to permit attachment of said teat cups to the teats of the cow in the subsequent stall; and
   b) actuate the retractor at a further subsequent stall to raise the cluster at the further subsequent stall to the up position such that when the dairyman operator is ready to milk the cow in said further subsequent stall, the cluster at said further subsequent stall is already in the up position and ready for attachment of said teat cups to the teats of the cow without the dairyman operator having to bend down and lift the cluster from the down position at said further subsequent stall.

3. The invention according to claim 2 wherein said subsequent stall is immediately adjacent said present stall, with no stall therebetween.

4. The invention according to claim 2 wherein said subsequent stall is separated from said present stall by at least one stall therebetween.

5. A milking parlor comprising a platform receiving cows, said platform having a plurality of spaced stall dividers defining milking stalls therebetween, the stall divider having a milking cluster comprising a claw and teat cups, a cluster pre-lift retractor and control raising said cluster to an up position above said platform prior to milking, such that when the dairyman operator is ready to milk the cow, said milking cluster is already in the up position and ready for attachment of the teat cups to the teats of the cow, without the dairyman operator having to bend down to lift the cluster to the up position.

6. In a milking parlor comprising a platform receiving cows, said platform having a plurality of spaced stall dividers defining milking stalls therebetween, the stall divider having a milking cluster comprising a claw and teat cups, and a cluster drop and lift retractor for raising and lowering said cluster, a method for saving a dairyman operator from bending down to lift the cluster comprising raising said cluster with said retractor to an up position above said platform ready for attachment of said teat cups to the teats of the cow in the respective milking stall, and lowering said cluster with said retractor to a down position below said platform after detachment of said teat cups from the teats of the cow.

7. The method according to claim 6 comprising providing an attachment command actuator at said stall divider, and actuating said attachment command actuator to:
   a) actuate the retractor at the present stall to release said cluster from the up position to permit attachment of the teat cups to the teats of the cow in the present stall; and
   b) actuate the retractor at a subsequent stall to raise the cluster at the subsequent stall to the up position such that when the dairyman operator is ready to milk the cow in said subsequent stall, the cluster at said subsequent stall is already in the up position and ready for attachment of the teat cups to the teats of the cow without the dairyman operator having to bend down and lift the cluster from the down position,
and further comprising, when the dairyman operator is at said subsequent stall, actuating the attachment command actuator at said subsequent stall to:
   a) actuate the retractor at said subsequent stall to release the cluster from the up position to permit attachment of the teat cups to the teats of the cow in said subsequent stall; and
   b) actuate the retractor at a further subsequent stall to raise the cluster at the further subsequent stall to the up position such that when the dairyman operator is ready to milk the cow in said further subsequent stall, the cluster at said further subsequent stall is already in the up position and ready for attachment of the teat cups to the teats of the cow without the dairyman operator having to bend down and lift the cluster from the down position.

8. The method according to claim 7 comprising providing said subsequent stall immediately adjacent said present stall, with no stall therebetween.

9. The method according to claim 7 comprising spacing and separating said subsequent stall from said present stall by at least one stall therebetween.

10. In a milking parlor comprising a platform receiving cows, said platform having a plurality of stall dividers defining milking stalls therebetween, the stall divider having a milking cluster comprising a claw and teat cups, a method for saving a dairyman operator from bending down to lift the milking cluster comprising pre-lifting the cluster to an up position above said platform prior to milking, such that when the dairyman operator is ready to milk the cow, said cluster is already in the up position and ready for attachment of the teat cups to the teats of a cow, without the dairyman operator having to bend down to lift the cluster to the up position.

11. A rotary milking parlor comprising a rotary platform receiving cows across a stationary bridge, said platform having a plurality of circumferentially spaced stall dividers defining milking stalls therebetween, the stall divider having a milking cluster comprising a claw and teat cups, and a cluster drop and lift retractor raising said cluster to an up position above said platform ready for attachment of said teat cups to the teats of a cow in a respective stall, and lowering said cluster to a down position below said platform after detachment of said teat cups from the teats of the cow.

12. The invention according to claim 11 wherein said platform has a circumferential border spaced from said bridge by a gap permitting rotation of said platform border past said bridge, and said cluster is attached to said retractor by a cord, said cord having a retracted position in said up position of said cluster, and an extended position in said down position of said cluster, said cord passing through said gap in said extended position, with said cluster passing beneath said bridge, and wherein said retractor raises said cluster to said up position after passing said bridge and prior to attachment of said teat cups to the teats, to save a dairyman operator from bending down to lift the cluster from said down position.

13. The invention according to claim 12 wherein said stall divider includes an attachment command actuator actuatable by the dairyman operator at a milking station to:
   a) actuate the retractor at the present stall to release said cord and said cluster from said up position to permit attachment of said teat cups to the teats of the cow in the present stall; and
   b) actuate the retractor at a succeeding stall to retract the cord and raise the cord and cluster at the succeeding stall to the up position such that when said platform rotates said succeeding stall to said milking station, the cluster at said succeeding stall is already in the up position and ready for attachment without the dairyman operator having to bend down and lift the cluster from the down position,
and wherein the dairyman operator at said milking station actuates the attachment command actuator at said now-rotated succeeding stall to:
   a) actuate the retractor at said now-rotated succeeding stall to release the cord and cluster from the up position to permit attachment of the teat cups to the teats of the cow in the now-rotated succeeding stall; and
   b) actuate the retractor at a further succeeding stall to retract the cord to raise the cord and cluster at said further succeeding stall to the up position.

14. The invention according to claim 13 wherein said succeeding stall is immediately adjacent said present stall, with no stall therebetween.

15. The invention according to claim 13 wherein said succeeding stall is separated from said present stall by at least one stall therebetween.

16. A rotary milking parlor comprising a rotary platform receiving cows across a stationary bridge, said platform having a plurality of circumferentially spaced stall dividers defining milking stalls therebetween, the stall divider having a milking cluster comprising a claw and teat cups, a cluster pre-lift retractor and control raising said cluster to an up position above said platform before the respective stall has rotated to a dairyman operator at a milking station, such that when said stall has rotated to said milking station, said cluster is already in the up position and ready for attachment of the teat cups to the teats of a cow, without the dairyman operator having to bend down to lift the cluster to the up position.

17. In a rotary milking parlor comprising a rotary platform receiving cows across a stationary bridge, said platform having a plurality of circumferentially spaced stall dividers defining milking stalls therebetween, the stall divider having a milking cluster comprising a claw and teat cups, and a cluster retractor for raising and lowering said cluster, a method for saving a dairyman operator from bending down to lift the milking cluster comprising raising said cluster with said retractor to an up position above said platform ready for attachment of said teat cups to the teats of a cow in the respective milking stall, and lowering said cluster with said retractor to a down position below said platform after detachment of said teat cups from the teats of the cow.

18. The method according to claim 17 wherein said platform has a circumferential border spaced from said bridge by a gap permitting rotation of said platform border past said bridge, and said cluster is attached to said retractor by a cord, said cord having a retracted position in said up position of said cluster, and an extended position in said down position of said cluster, said cord passing through said gap in said extended position, with said cluster passing beneath said bridge, and wherein said method further comprises raising said cluster with said retractor to said up position after passing said bridge and prior to attachment of said teat cups to the teats such that said cluster is already in said up position and ready for attachment of said teat cups to the teats without the dairyman operator having to bend down to lift the cluster from said down position.

19. The method according to claim 18 comprising providing an attachment command actuator at said stall divider, and actuating said attachment command actuator at a milking station to:
   a) actuate the retractor at the present stall to release said cord and said cluster from said up position to permit attachment of said teat cups to the teats of the cow in the present stall; and
   b) actuate the retractor at a succeeding stall to retract the cord and raise the cord and cluster at the succeeding stall to the up position such that when said platform rotates said succeeding stall to said milking station the cluster at said succeeding stall is already in the up position and ready for attachment without the dairyman operator having to bend down and lift the cluster from the down position, and further comprising actuating the attachment command actuator at said now-rotated succeeding stall to:
   a) actuate the retractor at said now-rotated succeeding stall to release the cord and the cluster from the up position at said now-rotated succeeding stall to permit attachment of said teat cups to the teats of the cow in the now-rotated succeeding stall; and
   b) actuate the retractor at a further succeeding stall to retract the cord to raise the cord and cluster at said further succeeding stall to the up position.

20. The method according to claim 19 comprising providing said succeeding stall immediately adjacent said present stall, with no stall therebetween.

21. The method according to claim 19 comprising spacing and separating said succeeding stall from said present stall by at least one stall there between.

22. In a rotary milking parlor comprising a rotary platform receiving cows across a stationary bridge, said platform having a plurality of circumferentially spaced stall dividers defining milking stalls therebetween, the stall divider having a milking cluster comprising a claw and teat cups, a method for saving a dairyman operator from bending down to lift the milking cluster comprising pre-lifting the cluster to an up position above said platform before the respective stall has rotated to a dairyman operator at a milking station, such then when said stall has rotated to said milking station, said milking cluster is already in the up position and ready for attachment of said teat cups to the teats of a cow, without the dairyman operator having to bend down to lift the milking cluster to the up position.

* * * * *